United States Patent [19]
Schildt

[11] Patent Number: 5,104,172
[45] Date of Patent: Apr. 14, 1992

[54] PICK-UP TAIL GATE ASSEMBLY

[76] Inventor: Eddie R. Schildt, 3420 Winchell La., Billings, Mont. 59102

[21] Appl. No.: 729,151

[22] Filed: Jul. 12, 1991

[51] Int. Cl.$^5$ .................................. B62D 33/027
[52] U.S. Cl. ...................... 296/50; 296/155; 160/201
[58] Field of Search ............ 296/50, 52, 57.1, 106, 296/155; 160/342, 343, 201

[56] References Cited

U.S. PATENT DOCUMENTS 2,766,822 10/1956 Potter .................................. 160/201
3,567,209 3/1971 Lathers ................................. 296/50

FOREIGN PATENT DOCUMENTS 1592155 7/1981 United Kingdom ................ 296/155

Primary Examiner—Dennis H. Pedder
Attorney, Agent, or Firm—Harry M. Cross, Jr.

[57] ABSTRACT

The present invention provides a retractable tail gate assembly for a pick-up truck vehicle. The tail gate comprises a plurality of panel sections that are hinged together to make up a flexible tail gate panel. Each panel section carries two or more guides, at least one at each end thereof, which track in left and right hand guide channels. Each guide channel is mountable to a truck side at the rear of the truck bed opening, one guide channel on each side of the bed opening. The guide channels are configured to extend from the top of the bed opening downward below the truck bed whereunder they are angled forward to end beneath truck bed at a point above the truck axle. A reversible motor is mounted beneath the truck bed and connected to the bottom edge of the panel by means of an extending and retracting mechanism.

7 Claims, 4 Drawing Sheets

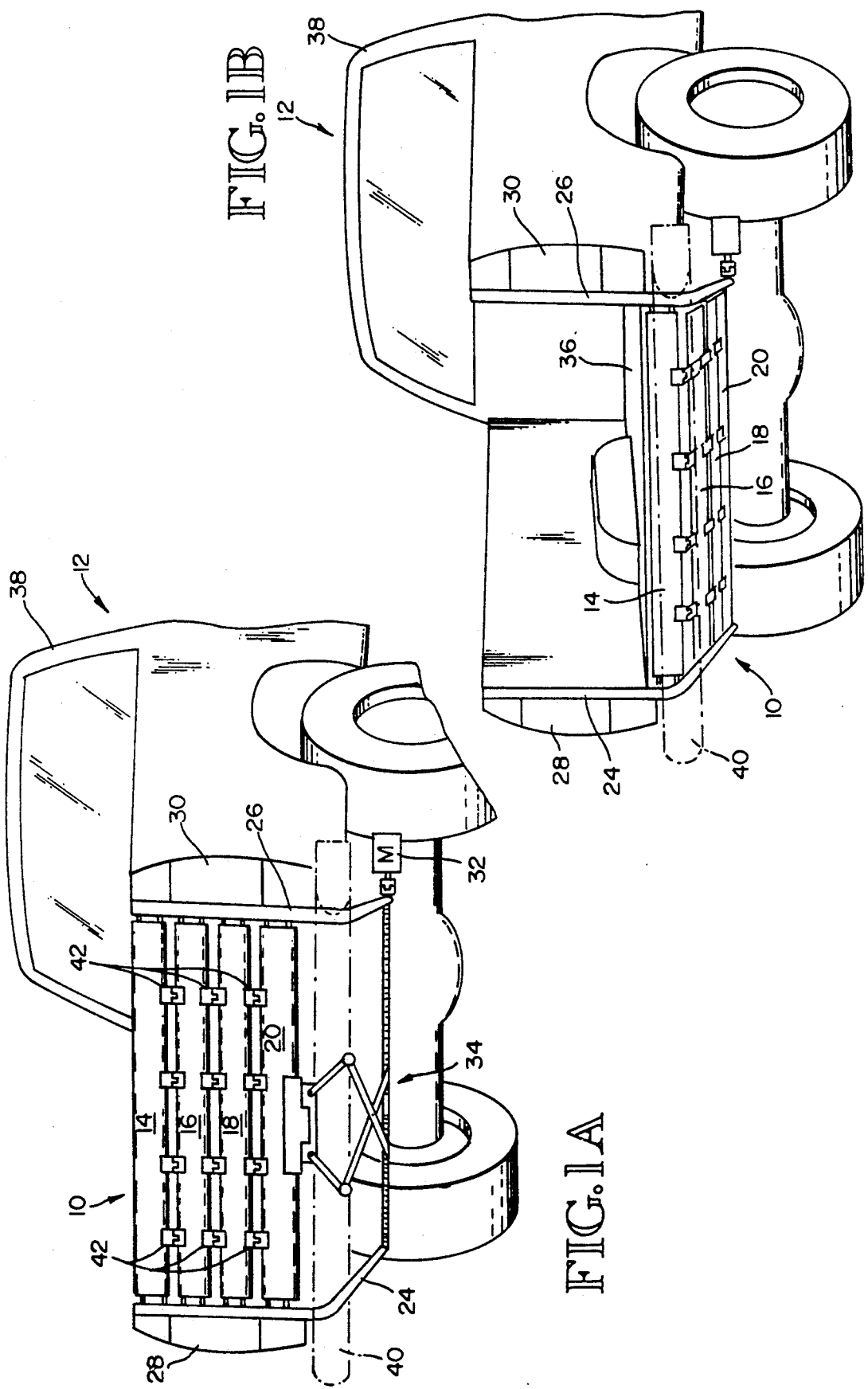

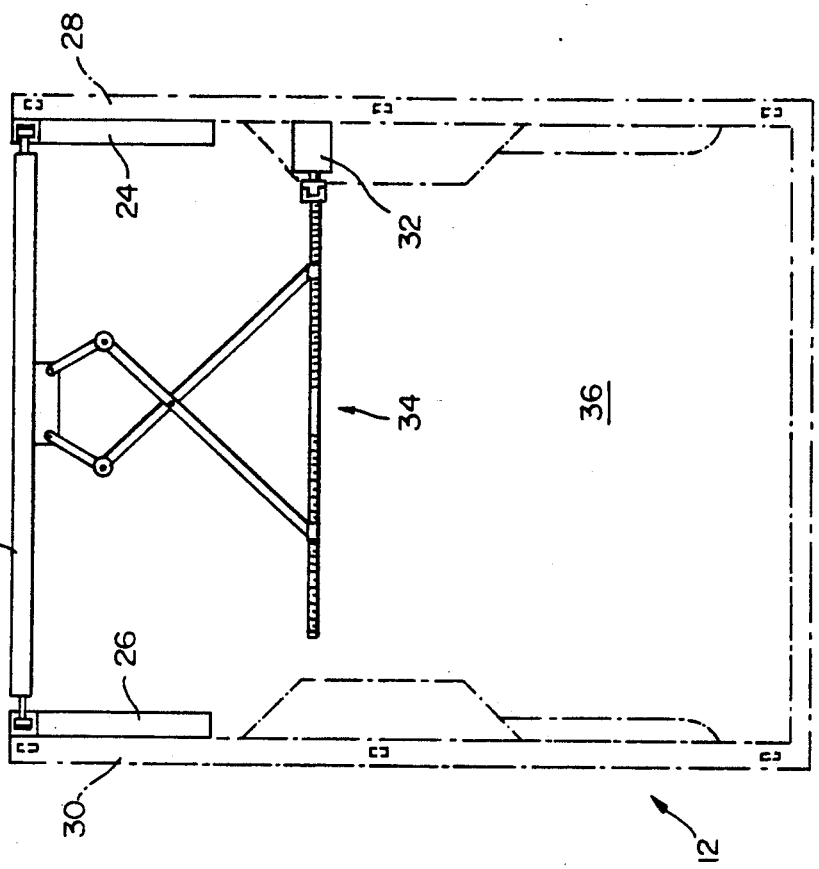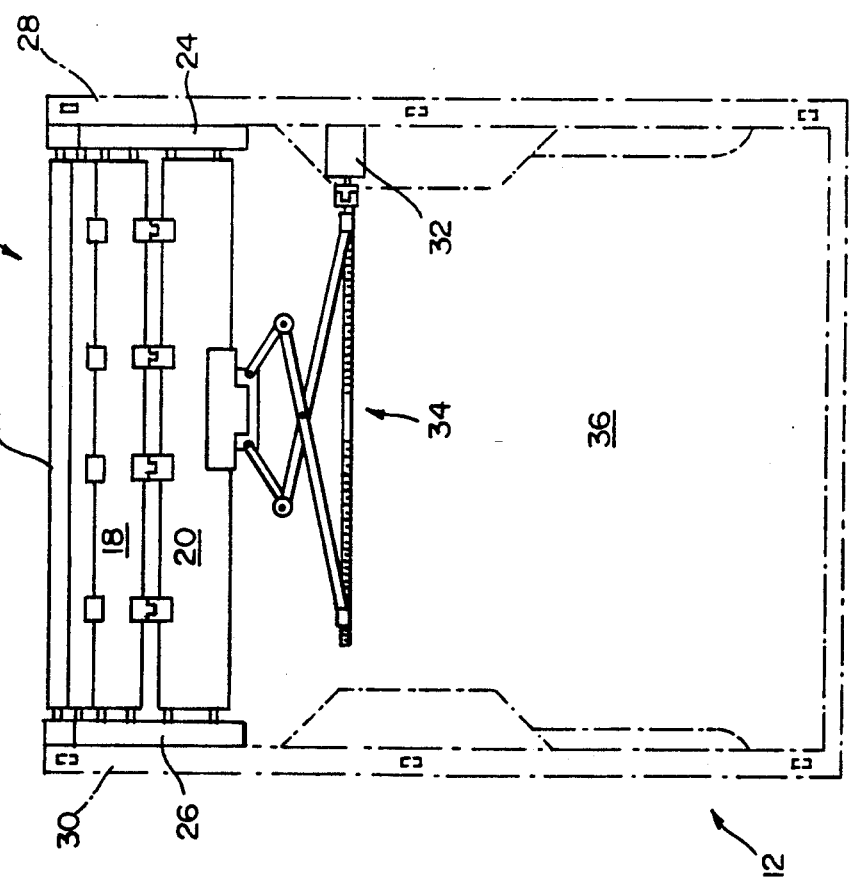

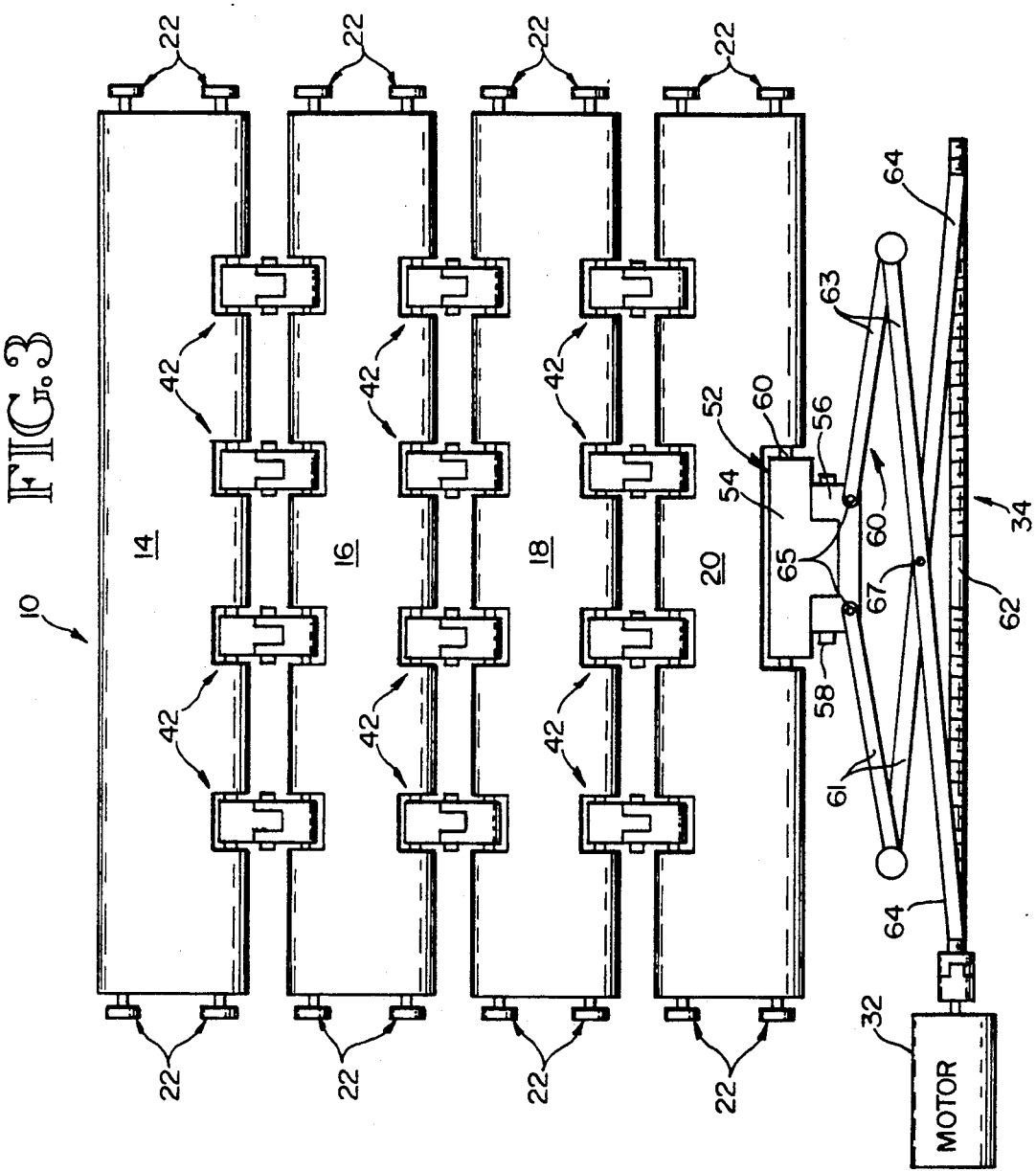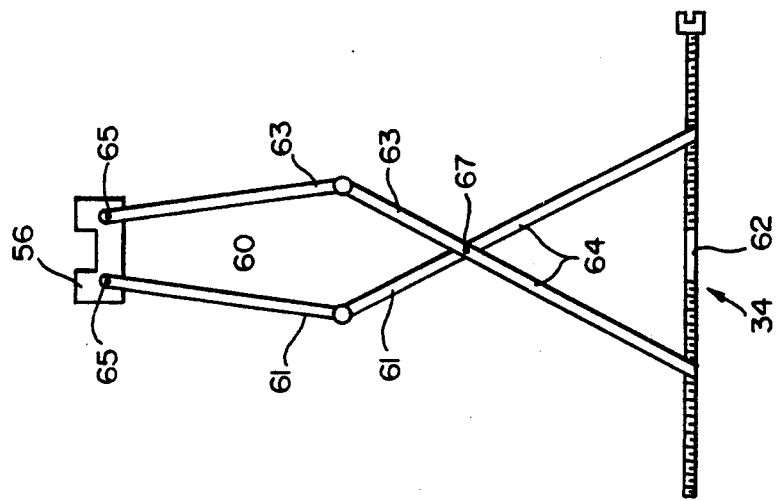

PICK-UP TAIL GATE ASSEMBLY

FIELD OF THE INVENTION

The invention relates to pick-up vehicles and, more particularly, to tail gate assemblies for use in substitution of the tilt-down tail gate that is a standard item as delivered from the factory.

BACKGROUND OF THE INVENTION

Pick-up truck vehicles (hereinafter sometimes referred to as "pick-ups" or "trucks") are delivered from the factory with standard bottom or side hinged tail gates that lock upright to close off their truck beds. Such a tail gate may be unlatched and tipped back and down to a position essentially co-planar with the truck bed to expose the bed from the back end of the truck.

Although handy for many purposes, such standard tail gates are not openable and closeable from the cab or from any location other than directly next to and behind the tail gate. Furthermore, there are times when the tail gate must be removed but when it would also be desireable to close off the end of the truck bed. As an example of this, when a 5th-wheel trailer is to be attached to a mounting plate located in the middle of the truck bed, it may be the case that the tail gate must be first removed. In this example, it would still be desireable to close off the end of the truck bed after the trailer is connected.

SUMMARY OF THE INVENTION

The present invention provides a retractable tail gate assembly for a pick-up truck vehicle. The tail gate comprises a plurality of panel sections that are hinged together to make up a flexible tail gate panel. Each panel section carries two or more guide means, at least one at each end thereof, which track in left and right hand guide channels. Each guide channel is mountable to a truck side at the rear of the truck bed opening, one guide channel on each side of the bed opening. The guide channels are configured to extend from the top of the bed opening downward below the truck bed whereunder they are angled forward to end beneath truck bed at a point above the truck axle. A reversible motor is mounted beneath the truck bed and connected to the bottom edge of the panel by means of an extending and retracting mechanism. The motor output may be driven in one direction to cause the mechanism to retract the flexible tail gate panel to expose the bed completely, or perhaps only partially, the panel sections being conveyed along the side channel tracks beneath the truck bed. The motor output may be driven in an opposite direction to cause the mechanism to extend the tail gate panel to close off the tail gate opening. The motor control may be located in the cab of the vehicle or at any other remote location, as desired. The tail gate assembly of this invention may be installed during the pick-up manufacturing process. Alternately, the assembly may be provided as an after-market accessory kit which may be installed after the vehicle is shipped from the factory.

BRIEF DESCRIPTION OF THE DRAWINGS

FIG 1A is a rear end perspective of a pick-up truck with the flexible tail gate of this invention installed and extended to close off the truck bed opening;

FIG. 1B is a rear end perspective of the FIG. 1A with the tail gate retracted to expose the truck bed opening;

FIG. 2A is a top plan view of the FIG. 1A truck configuration, the truck outline being shown in phantom, with the tail gate extended;

FIG. 2B is a top plan of the FIG. 1B truck configuration, the truck outline being shown in phantom, with the tail gate retracted:

FIG. 3 is a detail view of the tail gate panel of this invention coupled to a motor by means of a scissors-type jack screw actuating mechanism as it would appear when the tail gate panel was retracted;

FIG. 4 is a detail view of the FIG. 3 actuating mechanism as it would appear when the tail gate panel was extended.

DETAILED DESCRIPTION OF THE INVENTION

Figure 5:
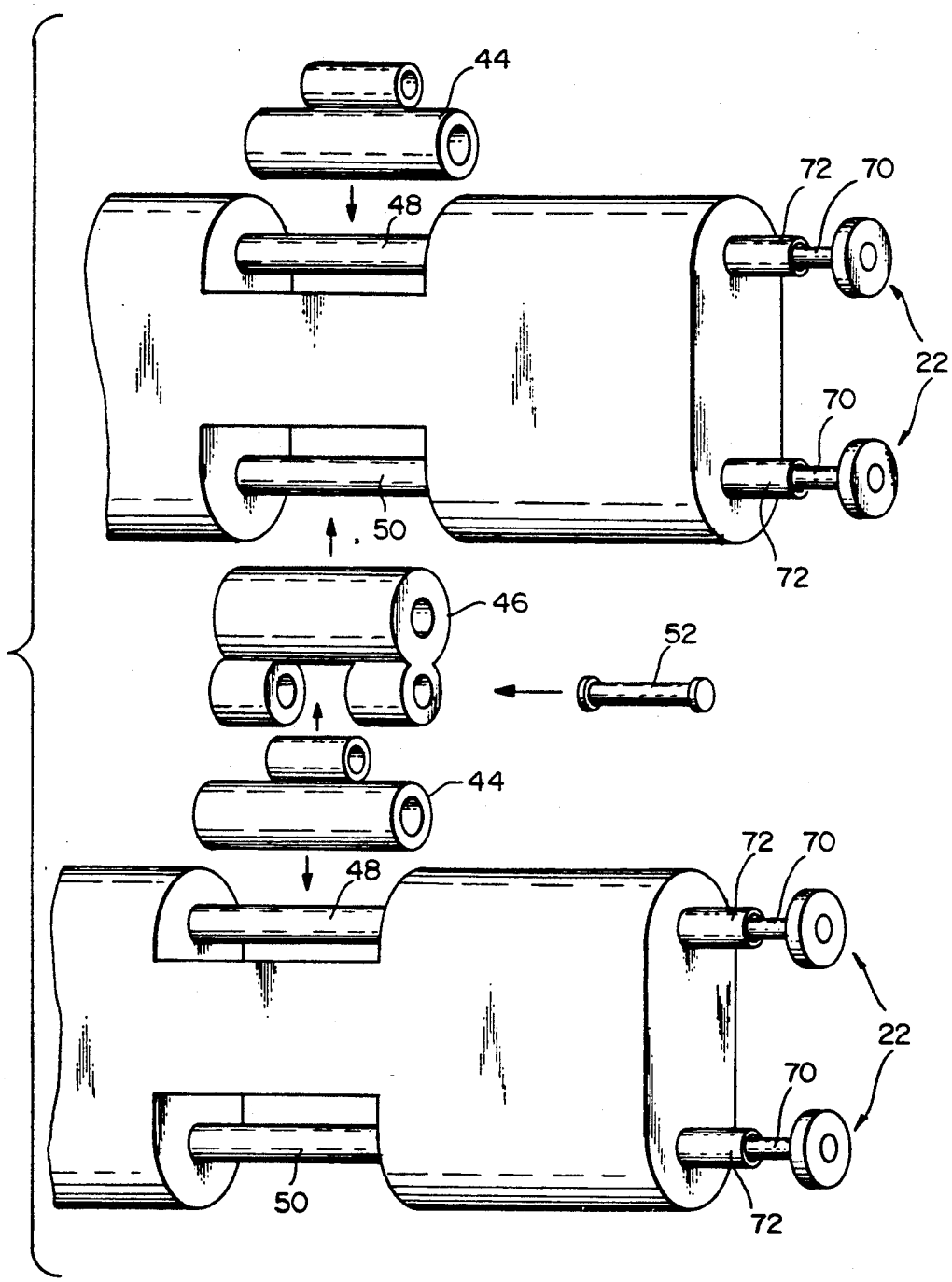
FIG. 5 is a detail exploded view of one side of two tail gate panel sections and their associated hinge elements and wheel guide means.

The present invention provides a retractable tail gate assembly 10 for a pick-up truck vehicle 12. The tail gate comprises a plurality of panel sections 14, 16, 18, 20 hinged together to make up a flexible tail gate panel. Each panel section carries two guide means 22 (see FIGS. 3 and 5), which track in left and right hand guide channels 24 and 26 (see FIGS. 1A and 1B). Each guide channel is mountable to a truck side, 28 or 30, at the rear of the truck bed opening, one guide channel on each side of the bed opening. The guide channels are configured to extend from the top of the bed opening downward below the truck bed whereunder they are angled forward to end beneath truck bed at an elevation above the truck axle. A reversible motor 32 is mounted beneath the truck bed and connected to the bottom edge of the panel by means of an extending and retracting mechanism 34. The motor output may be driven in one direction to cause the mechanism 34 to retract the flexible tail gate panel to expose the bed completely, or perhaps only partially, the panel sections being conveyed along the side channel tracks beneath the truck bed 36. The motor output may be driven in an opposite direction to cause the mechanism to extend the tail gate panel to close off the tail gate opening. The motor control may be located in the cab 38 of the vehicle or at any other remote location, as desired. The tail gate assembly of this invention may be installed during the pick-up manufacturing process. Alternately, the assembly may be provided as an after-market accessory kit which may be installed after the vehicle is shipped from the factory. The left and right hand guide channels and the panel sections are preferably sized so that they may fit between the truck rear bumper 40 and the rear edge of the truck bed body so that the bumper need not be relocated to provide the necessary clearance. (The bumper 40 is shown in phantom to make clear that the track and panel sections are illustrated as traversing the clearance space between the bumper and the truck body.

Each panel section is hinged to the next adjacent panel section by several hinges 42 (see FIGS. 1A and 3). Each hinge 42 is comprised (see FIG. 5) of male and female swivel joint sections 44, 46 which are pinned to their respective panel sections by means of mounting shafts 48, 50 mounted by the respective panel sections. The respective male and female hinge sections are connected by hinge pins 52. The top and bottom sides of the panel sections may be cut away as shown in FIG. 5 to accommodate the hinges so that the adjacent sides of adjacent panel sections may be located as close to one another as is desired.

The bottom panel section 20 is hinged to the actuating mechanism 34 by a similar, but larger, hinge structure 52. This hinge 52 (see FIG. 3) comprises male and female swivel joint sections 54, 56 connected together by a hinge pin 58 and connected to the panel sections by a mounting shaft 60 similarly to the configuration of hinges 42.

The scissors-type jack screw subassembly 60 of the actuating mechanism 34 is pivotally hinged to the hinge 52 as shown in FIGS. 3 and 4. The scissor subassembly comprises a pair of articulated jointed arms 61, 63 which are pinned to hinge section 56 at 65 and to one another at 67. The pins 65, 67 are pivot points that additionally give the scissor subassembly structural support. Subassembly 60 is extended and retracted by jack screw 62 which is provided with opposite hand threads that mount threaded couplers at the ends of the subassembly arms 64. Jack screw is coupled to the output shaft of motor 32 as shown. The jack screw and motor will be mounted to the truck by means of suitable plates or mounting brackets (not shown). The motor 32 is preferably an electrical motor operated from the truck's electrical system. On/off and reversing controls are preferably mounted within the operator cab 38 and connected appropriately into the truck electrical system to actuate and control the motor.

The panel section guide wheels 22 are mounted on rods 70 (see FIG. 5) that extend through the panel sections, end-to-end. The panel sections may be fitted with housing tubes 72 extending end-to-end and the rods 70 extended therethrough as shown in FIG. 5. These housing tubes may also double as the hinge mounting shafts 48. The wheels 22 are preferably ball bearing mounted to the ends of the rods 70.

The guide channels 24, 26 into which the panel section guide wheels 22 track, contain the guide wheels so that the wheels will track in the guide channels when the panel is retracted or extended. The guide channels may be provided with a "C"-shaped cross section and mounted so that their openings face one another. The guide channels are curved where they extend in front of the bumper to provided guide tracks that extend arcuately forward and under the truck bed for a sufficient distance to contain a completely retracted panel tail gate, as shown in FIGS. 1B and 2B. The lower ends of the channels should be open to permit water and debris to clear from the channels.

The panel sections are preferably 4.5 in. wide ×65 in. long (approximately); the guide channels, guide wheels, rods, tubes, hinges and pins are preferably fabricated from steel. The guide channels will be approximately 44 in. long. Each panel section is preferably constructed of a metal framework covered with a plastic or metal skin.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A retractable tail gate assembly for a truck vehicle for closing off or exposing a rear end opening to a truck bed, the assembly comprising a plurality of panel sections hinged together to make up a flexible tail gate panel; each panel section carrying at least one guide means at each end thereof, which respectively track in left and right hand guide channels; said left and right hand guide channels mountable to the truck at the rear of the truck bed opening, one guide channel being on each side of the truck bed opening; said guide channels being configured to extend from the top of the bed opening downward below the truck bed whereunder they are angled forward to end beneath the truck bed; a reversible motor remotely actuable to extend and retract the flexible tail gate panel, the motor output driveable in one direction to cause a mechanism to retract the flexible tail gate panel to expose the truck bed and in an opposite direction to cause the mechanism to extend the flexible tail gate panel to close off the tail gate opening; and the extending and retracting mechanism coupled to the output of said motor and to said tail gate panel for effecting the extension and retraction of the flexible tail gate panel.

2. The assembly of claim 1 wherein each panel section is hinged to the next adjacent panel section by at least two hinges, each hinge comprising a male and female swivel joint section pinned to their respective panel sections by means of mounting shaft mounted by the respective panel sections; and the mounting shafts each respectively connecting the respective swivel joint sections to the panel sections and a pin connecting the male and female swivel joint sections together.

3. The assembly of claim 2 wherein the top and bottom sides of the panel sections are cut away to accommodate the hinges so that the adjacent sides of adjacent panel sections may be located as close to one another as is desired.

4. The assembly of claim 3 wherein the bottom panel section is hinged to the extending and retracting mechanism by a similar, but larger, hinge structure comprising a male and a female swivel joint section connected together by a hinge pin and connected by a mounting shaft to the bottom panel section.

5. The assembly according to claim 4 wherein the extending and retracting mechanism comprises a scissors-type jack screw subassembly pivotally hinged to the larger hinge and coupled to the motor, and includes articulating arms and a jack screw provided with opposite hand threads that mount the arms.

6. The assembly according to claim 1 wherein the panel section guide means comprises wheels mounted on rods that extend through the panel sections, end-to-end; the panel sections being fitted with housing tubes extending end-to-end with the rods extended therethrough; the housing tubes being mounting shafts for panel-connecting hinges; and the hinges connecting adjacent panel sections to one another comprising male and female swivel joint sections; and pins connecting the male and female swivel joint sections together.

7. The assembly according to claim 1 wherein the guide channels contain the guide means so that the guide means will track in the guide channels when the panel is retracted or extended; the guide channels being provided with a "C"- shaped cross section and mounted so that their openings face one another; and the guide channels being curved whereby they may extend in front of the truck rear bumper to provide guide tracks that extend arcuately forward and under the truck bed.

* * * * *